United States Patent
Wang et al.

(10) Patent No.: US 11,157,108 B2
(45) Date of Patent: Oct. 26, 2021

(54) MODIFIED SENSOR ELECTRODES FOR OPTIMIZED EDGE DETECTION IN TOUCH-SENSITIVE DISPLAYS

(71) Applicant: Parade Technologies, Ltd., San Jose, CA (US)

(72) Inventors: Howard Wang, Shanghai (CN); Leeson Li, Shanghai (CN)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 59 days.

(21) Appl. No.: 16/059,533

(22) Filed: Aug. 9, 2018

(65) Prior Publication Data

US 2019/0073054 A1  Mar. 7, 2019

Related U.S. Application Data

(60) Provisional application No. 62/543,865, filed on Aug. 10, 2017.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05); *G06F 3/0448* (2019.05); *G06F 2203/04112* (2013.01)

(58) Field of Classification Search
CPC .................. G06F 3/044; G06F 3/0418; G06F 2203/04112; G06F 3/0416; G06F 3/048; G06F 3/041; G06F 3/043

USPC .................................................. 345/173–174
See application file for complete search history.

(56) References Cited

U.S. PATENT DOCUMENTS

| | | | |
|---|---|---|---|
| 5,045,644 A * | 9/1991 | Dunthorn ................ | G06F 3/045 178/18.05 |
| 2011/0025636 A1 * | 2/2011 | Ryu ...................... | G06F 3/0416 345/173 |
| 2013/0181943 A1 * | 7/2013 | Bulea ................... | G06F 3/0448 345/174 |
| 2014/0022202 A1 * | 1/2014 | Badaye ................ | G06F 3/0448 345/174 |
| 2015/0028894 A1 * | 1/2015 | Sleeman ............... | G01B 7/003 324/662 |

(Continued)

*Primary Examiner* — Kent W Chang
*Assistant Examiner* — Sujit Shah
(74) *Attorney, Agent, or Firm* — Morgan, Lewis & Bockius LLP

(57) ABSTRACT

An exemplary touch-sensitive array for optimized edge detection includes a first electrode structure having opposing first and second ends and including: a first transmit (TX) electrode pair at the first end of the first electrode structure, a plurality of core TX electrodes disposed between the first and second ends of the first electrode structure, and a second TX electrode pair at the second end of the first electrode structure. The touch-sensitive array further includes a second electrode structure having opposing first and second ends and including: a first receive (RX) electrode pair at the first end of the second electrode structure and including a first plurality of connection members, a plurality of core RX electrodes disposed between the first and second ends of the second electrode structure, and a second RX electrode pair at the second end of the second electrode structure and including a second plurality of connection members.

21 Claims, 12 Drawing Sheets

Sensing System 100

(56) References Cited

U.S. PATENT DOCUMENTS

| | | | |
|---|---|---|---|
| 2015/0177871 A1* | 6/2015 | Kim | G06F 3/044 |
| | | | 345/174 |
| 2015/0301679 A1* | 10/2015 | Kim | G06F 3/0416 |
| | | | 345/174 |
| 2015/0355757 A1* | 12/2015 | Hoch | G06F 3/0446 |
| | | | 345/174 |
| 2016/0041638 A1* | 2/2016 | Xie | G06F 3/0416 |
| | | | 345/173 |
| 2016/0054828 A1* | 2/2016 | Lien | G06F 3/0446 |
| | | | 345/174 |

\* cited by examiner

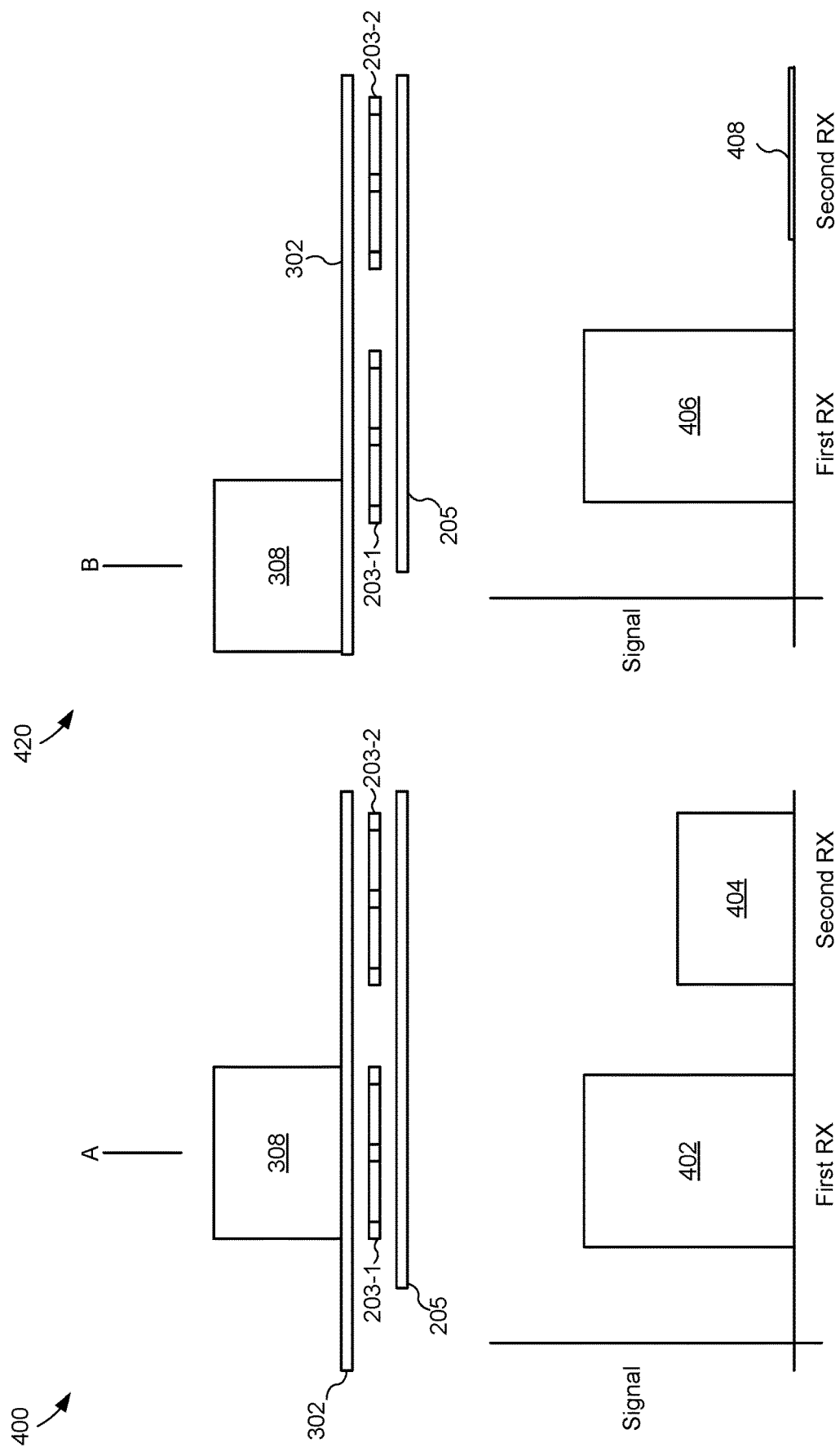

MODIFIED SENSOR ELECTRODES FOR OPTIMIZED EDGE DETECTION IN TOUCH-SENSITIVE DISPLAYS

RELATED APPLICATIONS

This application claims priority to U.S. Provisional Patent Application No. 62/543,865, filed Aug. 10, 2017, entitled "Modified Sensor Electrodes for Optimized Edge Detection in Touch-Sensitive Displays," which is hereby incorporated by reference in its entirety.

TECHNICAL FIELD

The disclosed implementations relate generally to touch-sensitive displays, and in particular, to improving edge detection in touch-sensitive displays.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device. One type of user interface device that has become more common operates by way of touch sensing. A touch-sensitive system (e.g., capacitance sensing) may include a touch screen, touch-sensor pad, a touch-sensor slider, or touch-sensor buttons, and may include an array of one or more sensor elements. Touch sensing typically involves measuring, through sensor signals (e.g., increases or decreases in electrode responses), a change in capacitance associated with the sensor elements to determine a presence of an object relative to the sensor elements. However, differentiating touches along an edge of the touch-sensitive system continues to present challenges. The inability to differentiate touches along an edge is particularly problematic when software applications include differing user interface features along the edge.

SUMMARY

Accordingly, there is a need for a touch-sensitive array that allows the touch-sensitive system to accurately detect touches along edges. One solution to the problem is modifying edge sensor electrodes of the touch-sensitive array, which are better suited for edge detection.

To accomplish this, the touch-sensitive array includes a first electrode structure (e.g., electrode structure 504, FIG. 5B) having opposing first and second ends and including: (i) a first transmit (TX) electrode pair at the first end of the first electrode structure, (ii) a plurality of core TX electrodes disposed between the first and second ends of the first electrode structure, and (iii) a second TX electrode pair at the second end of the first electrode structure. The touch-sensitive array further includes a second electrode structure (e.g., electrode structure 502, FIG. 5A) having opposing first and second ends and including: (i) a first receive (RX) electrode pair at the first end of the second electrode structure and including a first plurality of connection members, (ii) a plurality of core RX electrodes disposed between the first and second ends of the second electrode structure, and (iii) a second RX electrode pair at the second end of the second electrode structure and including a second plurality of connection members.

Each respective connection member of the first plurality of connection members is adjacent and parallel to a respective connection member of the second plurality of connection members. For example, as shown in FIG. 8A, a first connection member 806-1 of a first plurality of connection members is adjacent and parallel to a first connection member 808-1 of a second plurality of connection members, a second connection member 806-2 of the first plurality of connection members is adjacent and parallel to a second connection member 808-2 of the second plurality of connection members, and so on.

The first and second electrode structures are configured to reduce errors in reported locations of touches at or adjacent to edges of the touch-sensitive array. Moreover, the first and second electrode structures are configured to maintain signal balance across the touch-sensitive array.

In some implementations, the first and second TX electrode pairs each has a first overall shape and each of the plurality of core TX electrodes has a second overall shape that differs from the first overall shape. Alternatively, in some implementations, the first and second TX electrode pairs each has an overall shape and each of the plurality of core TX electrodes also has the overall shape. For example, the overall shape may be a rectangle. In some implementations, the first and second TX electrode pairs each has a surface area that is approximately double a surface area of each of the plurality of core TX electrodes.

Moreover, in some implementations, the first and second TX electrode pairs each comprise a first TX electrode and a second TX electrode. The first TX electrode has a first shape and the second TX electrode has a complementary second shape, both of which compose the first overall shape. The first and second shapes may differ from the first overall shape. For example, as shown in FIGS. 7A-7B, the first and second TX electrodes have complementary interlocking (e.g., interwoven) shapes, whereas the TX electrode pairs 702 and 704 as a whole have rectangular shapes. Moreover, the first and second shapes may differ from the second overall shape.

In some implementations, each core TX electrode of the plurality of core TX electrodes has a predefined surface area. In addition, a surface area of the first TX electrode and a surface area of the second TX electrode is substantially the same as the predefined surface area.

In some implementations, the first and second RX electrode pairs each has a third overall shape (e.g., overall shape of RX electrode pair 800, FIG. 8A) and each of the plurality of core RX electrodes has the second overall shape, the third overall shape being different from the first and second overall shapes. In some implementations, the first and second RX electrode pairs each has a surface area that is approximately double a surface area of each of the plurality of core RX electrodes.

Moreover, in some implementations, the first and second RX electrode pairs each comprise a first RX electrode and a second RX electrode. The first RX electrode has a third shape and the second RX electrode has a fourth shape, both of which compose the third overall shape. For example, as shown in FIG. 8A, RX electrode pair 800 includes a first RX electrode 802 and a second RX electrode 804. The first RX electrode 802 has the third shape and the second RX electrode 804 has the fourth shape.

In some implementations, a width of the first RX electrode is less than a width of the second RX electrode. For example, referring to FIG. 8B, the first RX electrode 802 has a first width (W1) and the second RX electrode 804 has a second width (W2). As shown, the first width (W3) is less than the second width (W2).

In some implementations, a width of the first RX electrode is substantially the same as a width of each of the plurality of core RX electrodes. For example, referring again to FIG. 8B, the first width (W1) of the first RX electrode 802 is substantially the same as a third width (W3) of core RX electrode 820.

In some implementations, the first electrode structure is disposed in a first direction and the second electrode structure is disposed in a second direction perpendicular to the first direction. Moreover, in some implementations, the first electrode structure is disposed on top of the second electrode structure, or vice versa, and each edge of the first electrode structure is aligned with one edge of the second electrode structure.

In some implementations, the touch-sensitive array comprises first, second, third, and fourth perpendicular edges (e.g., as shown in FIG. 6A). The first end of the first electrode structure corresponds to the first edge, the second end of the first electrode structure corresponds to the second edge, the first end of the second electrode structure corresponds to the third edge, and the second end of the second electrode structure corresponds to the fourth edge. In this way, each edge of the touch-sensitive array comprises a distinct electrode pair.

In some implementations, end connection members of the first plurality of connection members are shorter than middle connection members of the first plurality of connection members. For example, referring to FIG. 8A, each middle connection member 806-1-806-4 has a second length (D2) and end connection member 806-5 has a third length (D3), which is shorter than the second length (D2).

In some implementations, each of the second plurality of connection members is longer than corresponding connection members of the first plurality of connection members. For example, referring to FIG. 8A, each of the second plurality of connection members 808-1-808-5 has a first length D1 and the first plurality of connection members has lengths of D3 and D2, which are both shorter than the first length D1.

In some implementations, respective end connection members (e.g., connection member 808-5) of the second plurality of connection members have a first shape and respective middle connection members of the second plurality of connection members and the first plurality of connection members have a second shape different from the first shape.

In some implementations, the first shape includes a first portion disposed in a first direction, a second portion disposed in a second direction perpendicular to the first direction, and a third portion offset from the first portion and disposed in the first direction. Moreover, in some implementations, the first portion is longer than the second portion and shorter than the third portion and a length of the second portion is substantially equal to a height of the connection members.

In some implementations, the touch-sensitive array is included in a touch-sensitive device, such as a mobile phone or a smart watch.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

FIGS. 4A-4B illustrate cross-sectional views of a touch-sensitive device and desired signal response graphs, in accordance with various implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices used to reject false touches on a touch-sensitive array caused by water. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
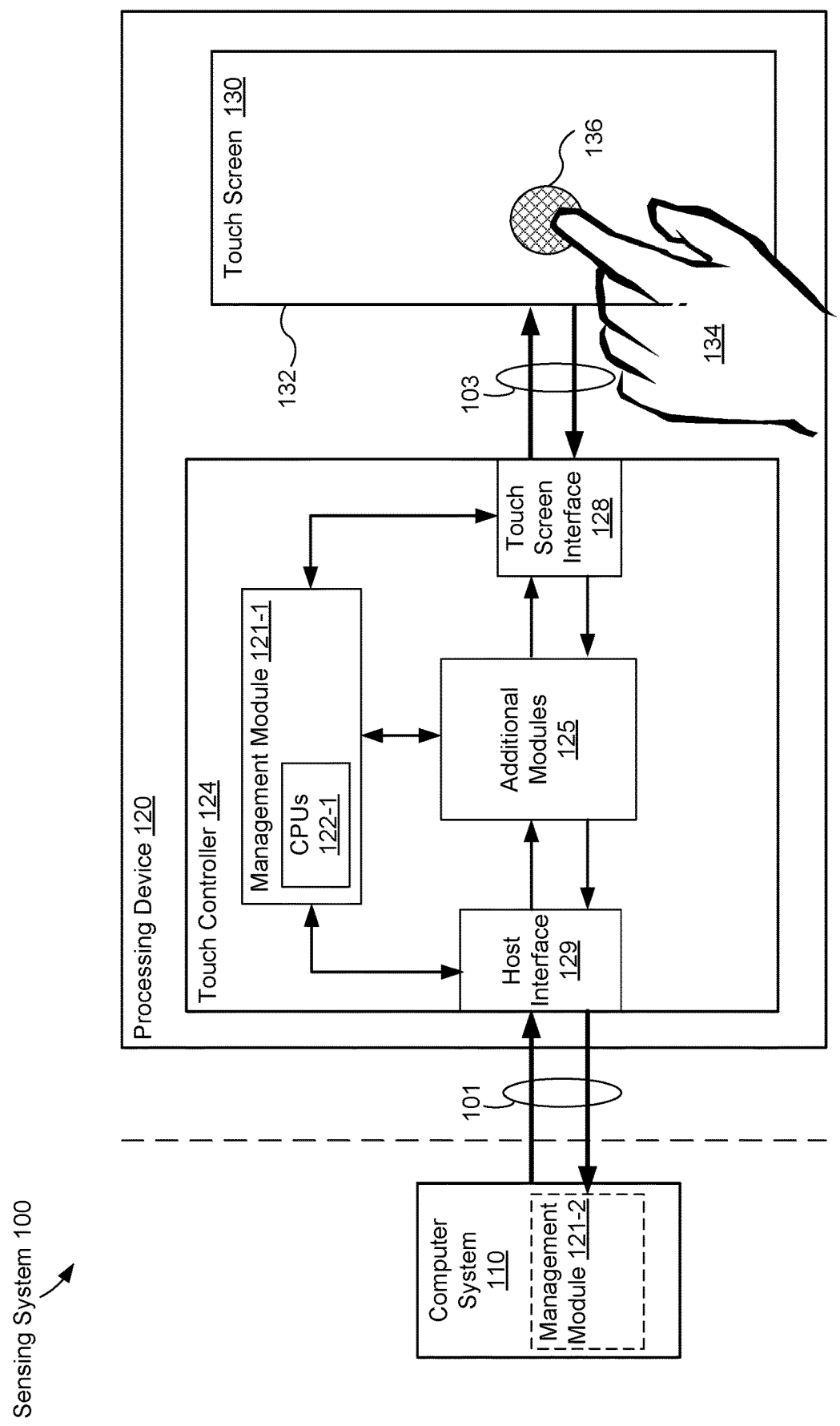
FIG. 1 is a block diagram illustrating a sensing system, in accordance with various implementations.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, the sensing system 100 includes a processing device 120 (also referred to herein as a touch-sensitive device), which includes a touch controller 124 and a touch screen 130 (also referred to herein a touch-sensitive display), and is used in conjunction with, or includes, a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input.

In some implementations, the processing device 120 includes a mobile device, such as a mobile phone or tablet computer. In some implementations, the processing device 120 includes a wearable device, such as a smart watch or bracelet. In some implementations, the sensing system 100 includes a mobile device or a wearable device. In some implementations, the processing device 120 may be part of various other touch-sensitive products (e.g., a bicycle computer, a navigation (e.g., global position system) device, a television, a remote control, a monitor, a handheld multimedia device, a handheld media (audio and/or video) player, a handheld gaming device, etc.).

In some implementations, non-volatile memory in the processing device 120 stores program instructions. In some implementations, the processor 122-1 fetches and executes the program instructions. In some implementations, a touch interface 128 acts as an interface between the touch screen 130 and the processor device 120. In some implementations, under control of the processor 120, the touch interface 128 scans the touch panel and generates response data (e.g., raw sensor data) from the touch screen 130.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, connections 103 convey raw sensor data (e.g., response data) and/or control signals. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a touch-sensitive array 132 (e.g., a capacitive-sense array) that forms a touch-sensitive display.

Figure 5B:
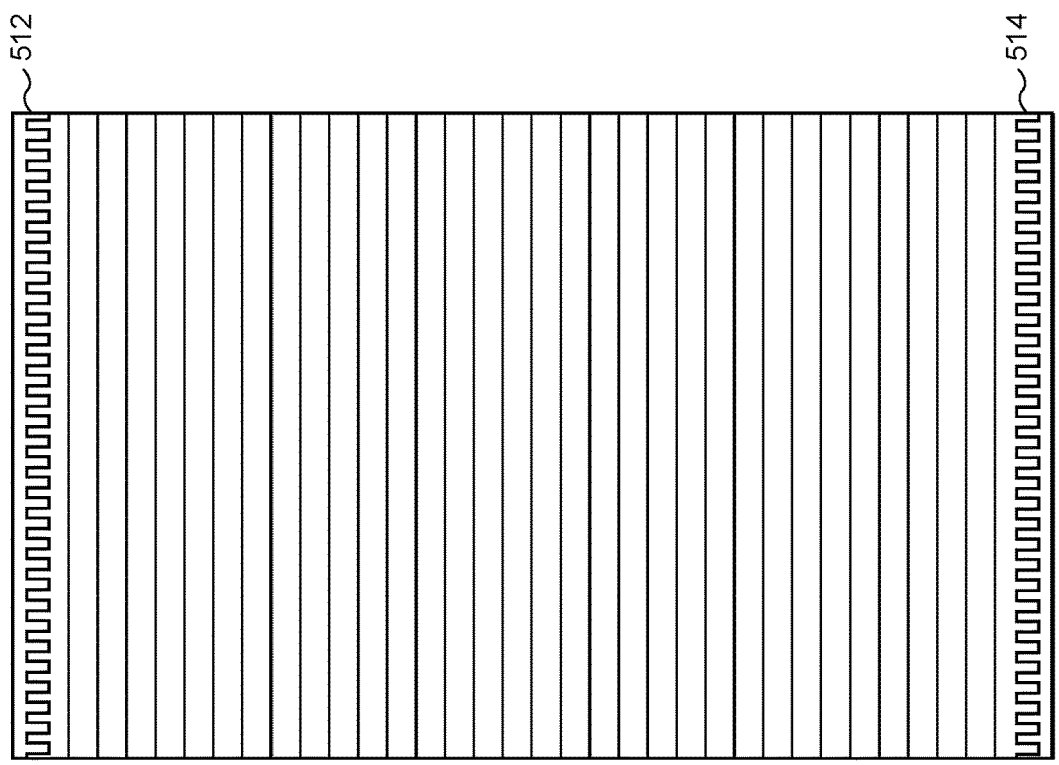
FIGS. 5A-5B illustrate sensor electrode structures of a modified bars and strips electrode structure, in accordance with various implementations.
Figure 5A:
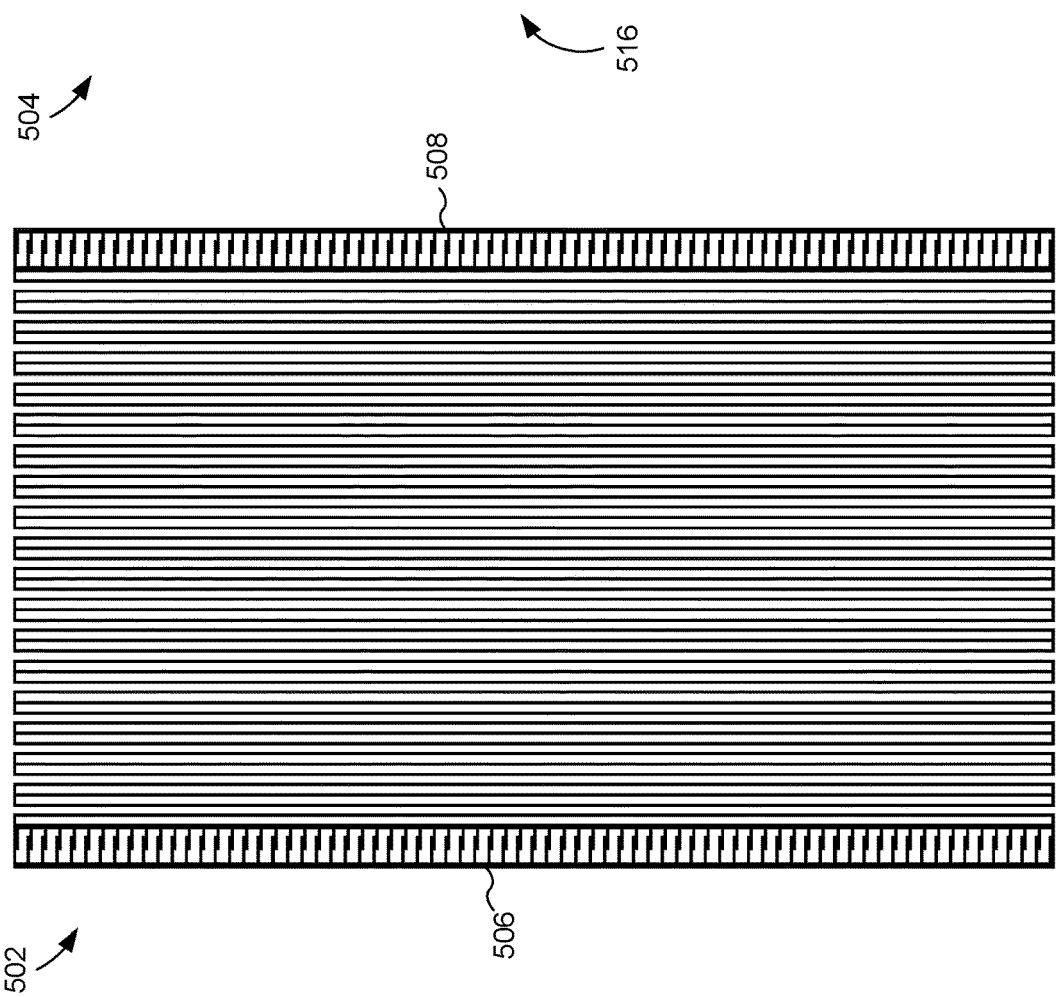

In some implementations, the touch-sensitive array 132 includes one or more electrode structures (e.g., RX electrode structure 502, FIG. 5A; and TX electrode structure 504, FIG. 5B). The one or more electrode structures include sensor electrodes (also referred to herein as sensor elements and electrodes), such as one or more light-sensitive elements, light emitting elements, photosensitive elements, pressure sensitive elements, and/or capacitive sensor elements (also referred to as sensor electrodes). The sensor elements are electrodes of conductive material, such as copper. The touch-sensitive array 132 is sensitive to an input object 134 at a location 136 (e.g., a user's finger or a stylus).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the touch-sensitive array 132, a presence of one or more input objects 134 proximate or in contact with one or more sensor electrodes of the touch-sensitive array 132. In some implementations, the management module 121-1 performs operations (e.g., scan operations) to sense, via the touch-sensitive array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the touch-sensitive array 132 when an input object is proximate to or in contact with the touch screen 130. The sensing ability of the sensing module 121-1 depends on the type of sensors used in the touch screen 130 (e.g., capacitance sensors versus pressure sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems) using, in one implementation, configurable user modules ("Ums"). In some implementations, the additional module(s) 125 include an analog block array that is used to implement a variety of analog circuits. The analog block array may also be coupled to the GPIO ports.

Figure 2B:
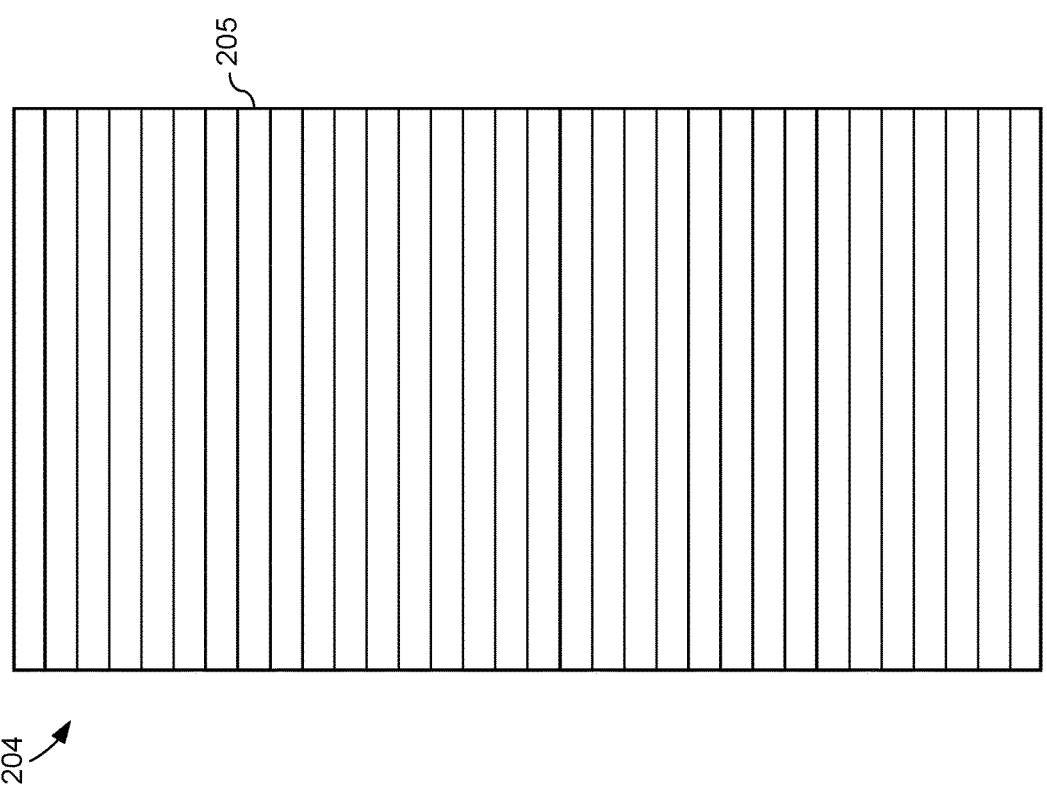
FIGS. 2A-2B illustrate sensor electrode structures of a bars and strips electrode structure, in accordance with various implementations.
Figure 2A:
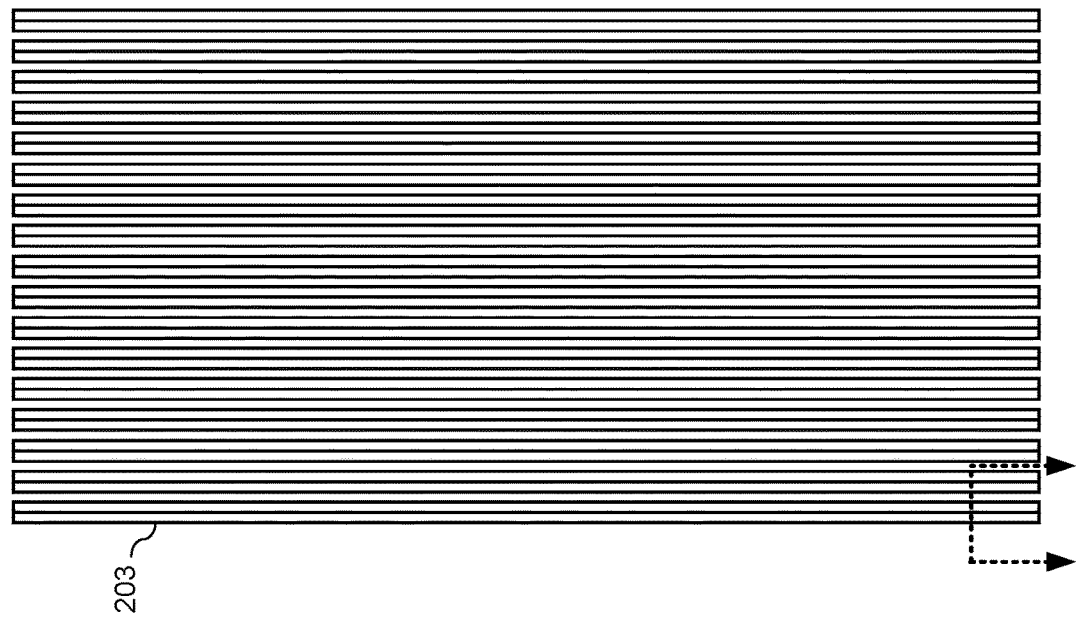

FIGS. 2A-2B illustrate sensor electrode structures of a bars and strips electrode structure, in accordance with various implementations. In particular, FIG. 2A is a receive (RX) electrode structure 202. The RX electrode structure 202 includes RX sensor electrodes 203, each having a three-prong design (e.g., core RX sensor electrode 820, FIG. 8B) and a first surface area (e.g., conductive material that composes each RX sensor electrode 203 defines the first surface area).

FIG. 2B is a transmit (TX) electrode structure 204. The TX electrode structure 204 includes TX sensor electrodes 205, each having a rectangular design (e.g., core TX sensor electrode 607, FIGS. 6B-6C) and a second surface area. In some implementations, the first and second surface areas are the same. Alternatively, in some implementations, the first and second areas differ. When combined (e.g., the RX electrode structure 202 is disposed on top of the TX electrode structure 204, or vice versa), a bars and strips electrode structure is formed.

Because each RX sensor electrode 203 has the first surface area and each TX sensor electrode 205 has the second surface area, the bars and strips electrode structure achieves signal balance and touch difference-count balance. Signal balance is achieved when a signal response of a touch at a first location of the bars and strips electrode structure is the same as a signal response of a touch at a second location of the bars and strips and electrode structure (assuming equal touch objects). Signal balance is measured in two forms: (1) mutual capacitance coupling of an RX sensor electrode 203 with a TX sensor electrode 205 (CM) during a touch, and (2) self capacitance of a channel (e.g., a signal response for a single RX sensor electrode 203 or a single TX sensor electrode 205) during a touch (CP).

Figure 9:
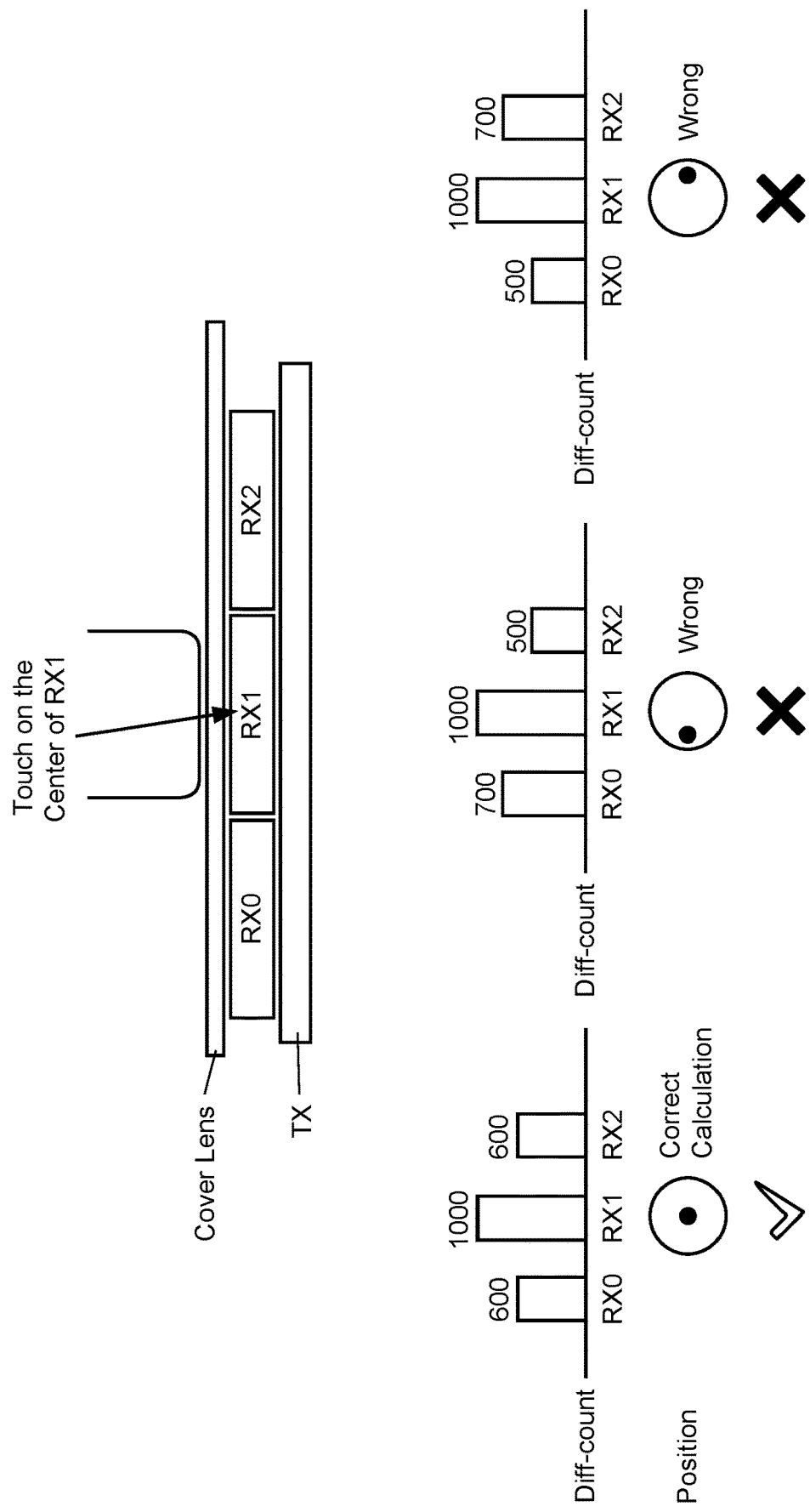
FIG. 9 illustrates a touch-sensitive array having a balanced touch-difference count.

A touch difference-count refers to a signal response caused by a touch (e.g., an increase or decrease in capacitance from a baseline caused by the touch), and the touch difference-count is said to be balanced when, as an example, a touch centered above a sensor electrode is reported in such a manner (e.g., the largest touch difference-count is reported at the sensor electrode, and neighboring sensor electrodes are reported as having equal touch difference-counts, as shown in FIG. 9).

Accurate edge detection, however, is a common issue with the bars and strips electrode structure (discussed below with reference to FIGS. 3A-3B). To address these issues, edge sensor electrodes of the RX electrode structure 202 and TX electrode structure 204 are modified (discussed in greater detail below). Additionally, the edge sensor electrodes are modified in such a manner as to maintain signal balance and touch difference-count balance.

For ease of discussion, the RX sensor electrodes 203 shown in FIG. 2A are referred to herein as "core RX sensor electrodes" and the TX sensor electrodes 205 shown in FIG. 2B are referred to herein as "core TX sensor electrodes."

Figures 3A, 3B:
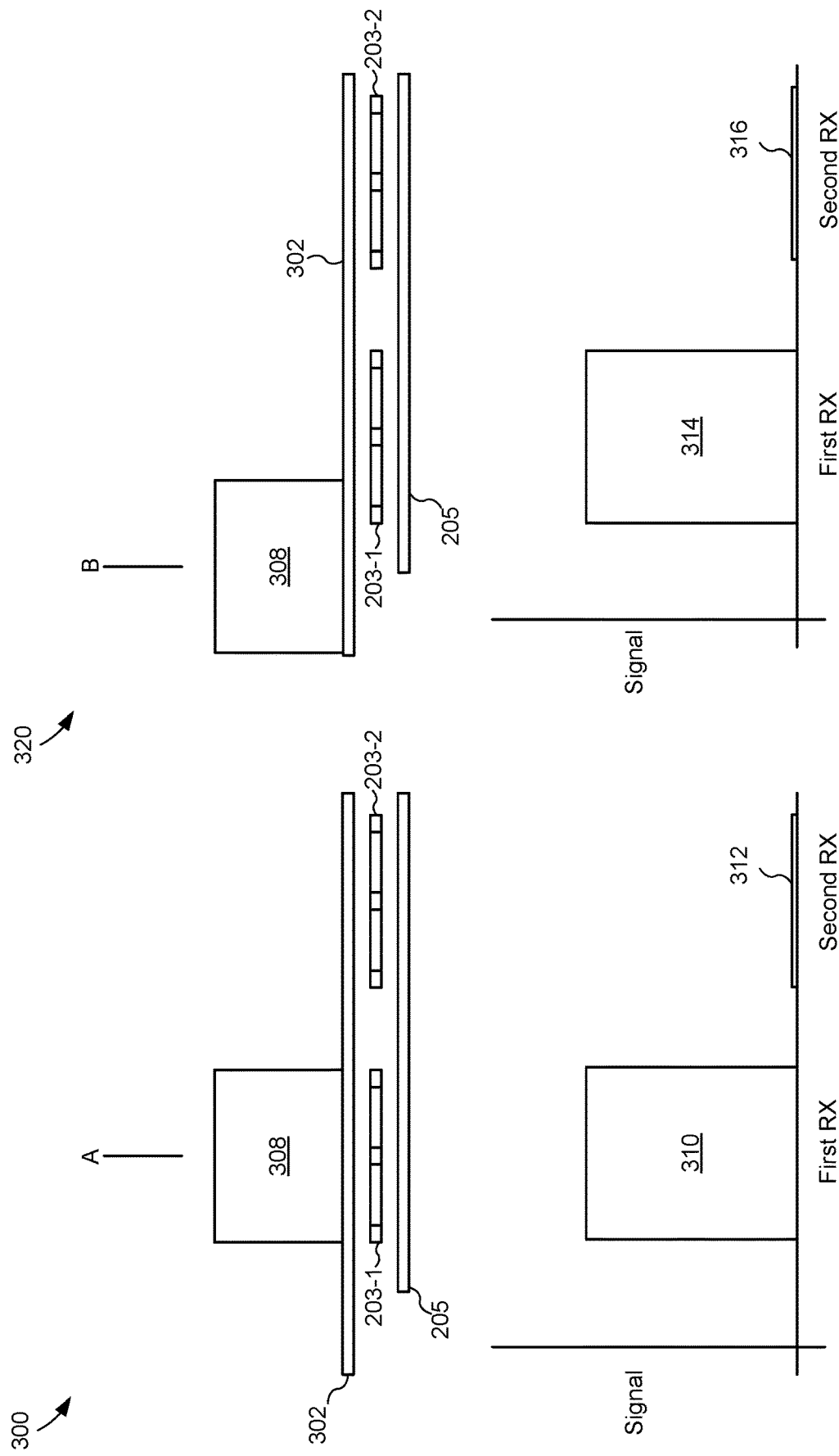
FIGS. 3A-3B illustrate cross-sectional views of a touch-sensitive device having a bars and strips electrode structure and corresponding signal response graphs, in accordance with various implementations.

FIGS. 3A-3B are cross-sectional views of a touch-sensitive device having the bars and strips electrode structure (e.g., taken along line A-A', FIG. 2A, after the RX electrode structure 202 is disposed on top of the TX electrode structure 204), and corresponding signal response graphs. The cross-sectional views 300 and 320 are of an edge region of the touch-sensitive device. The touch-sensitive device includes a dielectric layer 302 (e.g., glass cover), a first RX sensor electrode 203-1, a second RX sensor electrode 203-2, and a TX sensor electrode 205. In addition, a touch object 308 (e.g., a metal block, a user's finger, a stylus, etc.) is positioned directly over the first RX sensor electrode 203-1 (at position A). The first RX sensor electrode 203-1 defines an edge of the bars and strips electrode structure (e.g., no additional RX sensor electrodes left of the first RX sensor electrode 203-1). Due to the placement of the touch object 308, a signal response 310 for the first RX sensor electrode 203-1 is substantial (e.g., the signal response 310 satisfies a response threshold, and therefore, a touch is reported at the first RX sensor electrode 203-1) and a signal response 312 for the second RX sensor electrode 203-2 is approximately zero. As such, the reported touch location is the center of the first RX sensor electrode 203-1.

Now, referring to FIG. 3B, the touch object 308 has translated left, and as a result, is offset from the center of the first RX sensor electrode 203-1 (at position B). Ideally, if the touch object 308 changes its position, then some change occurs in the corresponding signal response graph. However, a signal response 314 for the first RX sensor electrode 203-1 when the touch object 308 is at position B is substantially similar (if not the same) to the signal response 310 for the first RX sensor electrode 203-1 when the touch object 308 is at position A. Additionally, a signal response 316 for the second RX sensor electrode 203-2 when the touch object 308 is at position B is substantially similar (if not the same) to the signal response 312 for the second RX sensor electrode 203-2 when the touch object 308 is at position A. As such, the signal response graphs have not changed, even though the touch object 308 moved from position A to position B.

Such a result is problematic when an application executing on the touch-sensitive device includes features along an edge of the touch-sensitive display. For example, a first feature of the application may be triggered when the touch object 308 is at position A (e.g., a first affordance) and a second feature of the application may be triggered when the touch 308 is at position B (e.g., a second affordance). However, the first feature (or the second feature) will not be triggered if the application (or a processor of the touch-sensitive device) cannot differentiate the touch object 308 at position A from the touch object 308 at position B. Instead, the application will simply execute one of the features twice, even though the user desired to trigger the first feature and the second feature.

FIGS. 4A-4B show the same cross-sectional views 300 and 320 of FIGS. 3A-3B, however, the corresponding signal response graphs show desired results from movement of the touch object 308 discussed above. As shown, when the touch object 308 is at position A, a signal response 404 for the second RX sensor electrode 203-2 is approximately half of a signal response 402 for the first RX sensor electrode 203-1. Moreover, when the touch object 308 is at position B, a signal response 408 for the second RX sensor electrode 203-2 is approximately zero and the signal response 406 for the first RX sensor electrode 203-1 remains substantially the same. Because of this, the application (or the processor of the touch-sensitive device) can differentiate the touch object 308 at position A from the touch object at position B. For example, the touch object 308 at position A creates a first set of response signals and the touch object 308 at position B creates a second set of response signals different from the first set of response signals, where the first set of response signals corresponds to a first feature and the set second of response signals corresponds to a second feature.

Differentiating touches on an edge region of the touch-sensitive display continues to present challenges. Accordingly, the electrode structures described below facilitate touch differentiation on the edge region of the touch-sensitive display, i.e., the expected results shown in FIGS. 4A-4B are obtained by modifying edge sensor electrodes of the bars and strips electrode structure.

Although not shown, signal response graphs for the TX sensor electrodes of the bars and strips electrode structure resemble those shown in FIGS. 3A-3B for the RX sensor electrodes. Because of this, the signal response graphs for the TX sensor electrodes have been omitted for the sake of brevity. However, as will be discussed below, RX edge sensor electrodes and TX edge sensor electrodes are modified to obtain the results shown in FIGS. 4A-4B.

FIGS. 5A-5B illustrate sensor electrode structures of a modified bars and strips electrode structure, in accordance with various implementations.

FIG. 5A is a RX electrode structure 502 and FIG. 5B is a TX electrode structure 504. When combined (e.g., the RX electrode structure 502 is disposed on top of the TX electrode structure 504, or vice versa), a modified bars and strips electrode structure is formed (the "modified electrode structure"). The modified electrode structure differs from the bars and strips electrode structure described above with reference to FIGS. 2A-2B. In particular, edge sensor electrodes of the RX electrode structure 202 and edge sensor electrodes of the TX electrode structure 204 have been modified (i.e., sensor electrodes at the ends of the RX and TX electrode structures are modified).

As shown, the RX electrode structure 502 has opposing first and second ends. The RX electrode structure 502 includes a first RX electrode pair 506 at the first end (e.g., the first RX electrode pair 506 extends along the first end) and a second RX electrode pair 508 at the second end (e.g., the second RX electrode pair 508 extends along the second end). In some implementations, the second RX electrode pair 508 is the same as the first RX electrode pair 506. Alternatively, in some implementations, the second RX electrode pair 508 differs from the first RX electrode pair 506.

Figure 8A:
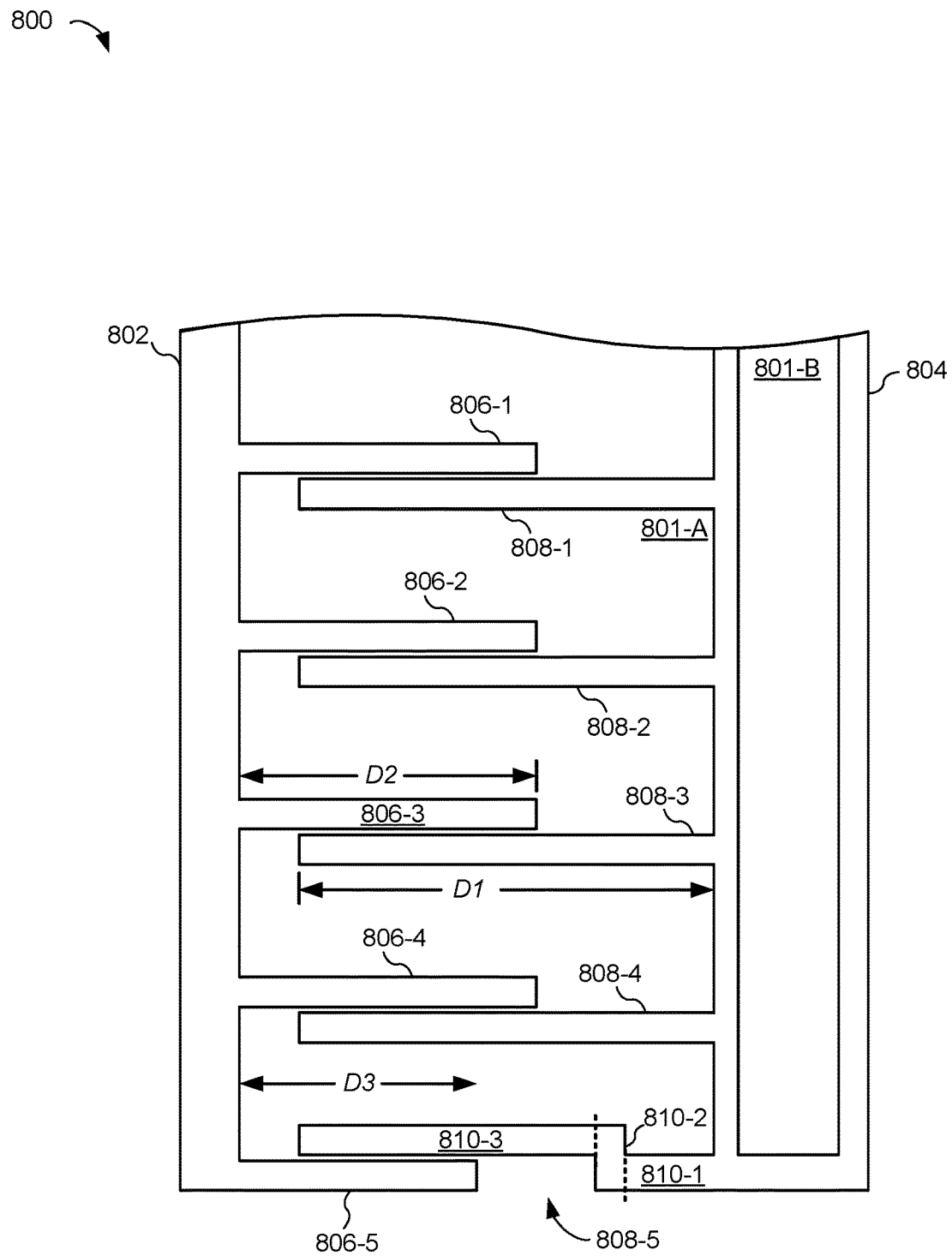
FIG. 8A illustrates an exemplary RX sensor electrode pair, in accordance with various implementations.

FIG. 8A shows a portion of an exemplary RX electrode pair 800, and as shown, the RX electrode pair 800 includes a first RX electrode 802 and a second RX electrode 804. The first RX electrode 802 includes a first plurality of connection members 806-1-806-5 and the second RX electrode 804 includes a second plurality of connection members 808-1-808-5. RX electrode pairs are discussed in further detail below with reference to FIGS. 8A-8B.

The RX electrode structure 502 further includes a plurality of core RX sensor electrodes 510 (e.g., RX electrodes 203, FIG. 2A) disposed between the first and second ends of the RX electrode structure 502. The plurality of core RX sensor electrodes 510 differs from the first and second RX electrode pairs. For example, the first and second RX electrode pairs have an overall shape that differs from an overall shape of the plurality of core RX sensor electrodes 510 (e.g., three-prong shape). A portion of an exemplary core RX electrode 820 is provided in FIG. 8B.

The TX electrode structure 504 has opposing first and second ends. The TX electrode structure 504 includes a first TX electrode pair 512 at the first end (e.g., the first TX electrode pair 512 extends along the first end) and a second TX electrode pair 514 at the second end (e.g., the second TX electrode pair extends along the second end). In some implementations, the second TX electrode pair 514 is the same as the first TX electrode pair 512. Alternatively, in some implementations, the second TX electrode pair 514 differs from the first TX electrode pair 512.

Figure 7A:
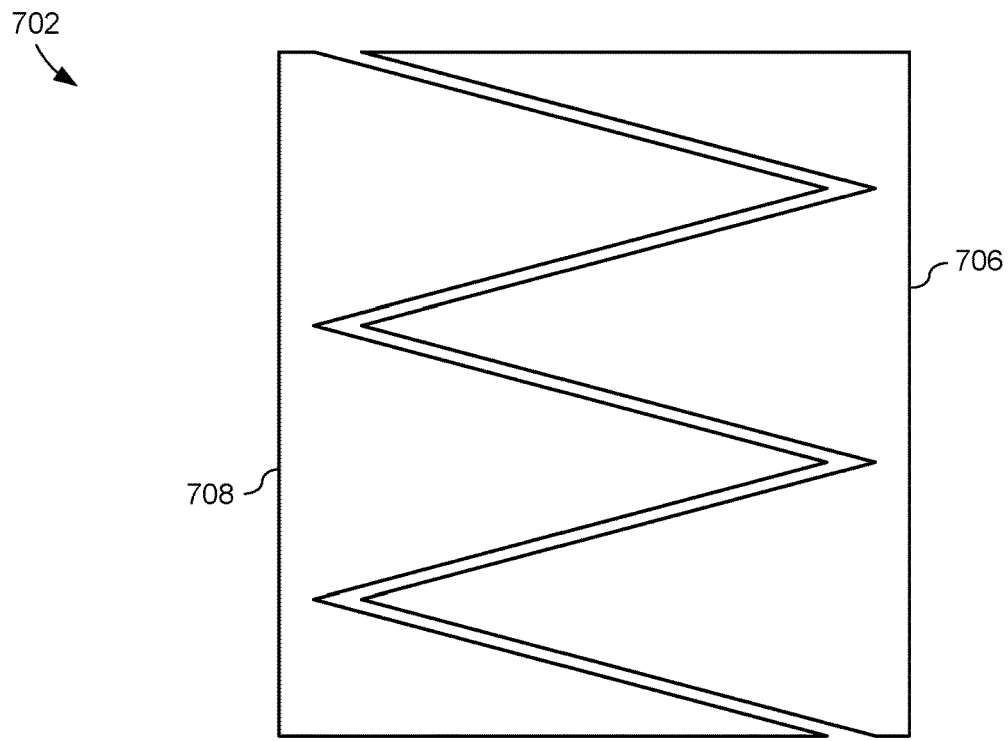
FIGS. 7A-7B illustrate exemplary TX sensor electrode pairs, in accordance with various implementations.
Figure 7B:
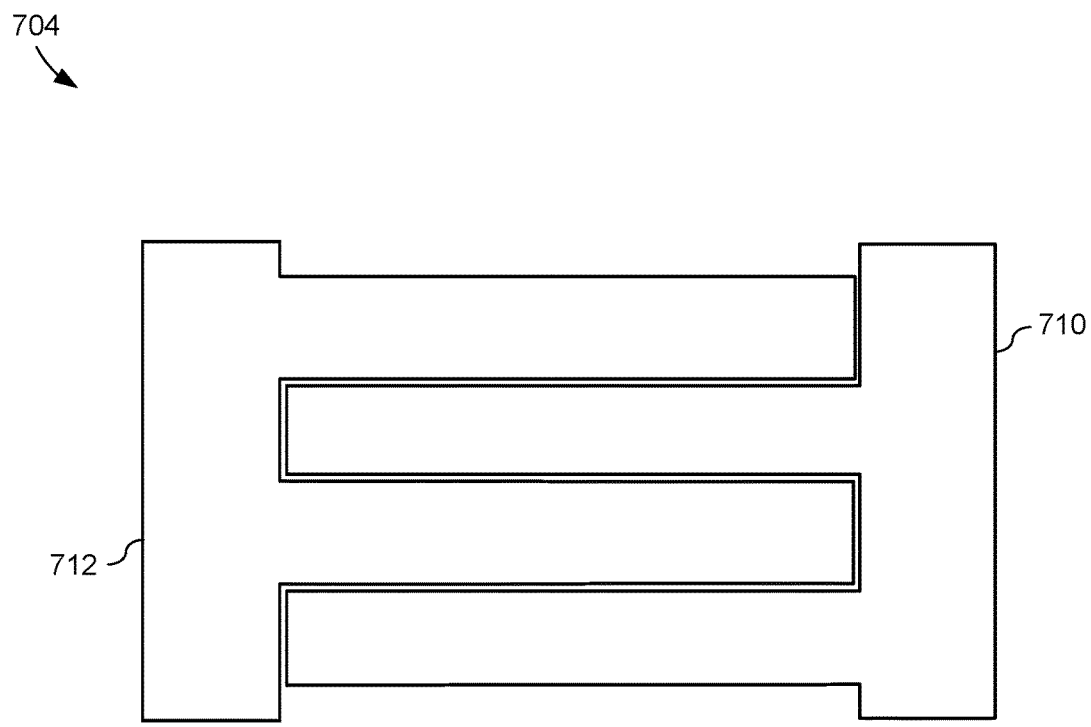

FIGS. 7A-7B show exemplary TX electrode pairs. In one example, the TX electrode pair 702 includes a first TX electrode 706 and a second TX electrode 708, where the first and second TX electrodes have a first edge pattern (e.g., a zig-zag edge pattern). In another example, the TX electrode pair 704 includes a first TX sensor electrode 710 and a second TX sensor electrode 712, where the first and second TX electrodes have a second edge pattern (e.g., a comb pattern).

The TX electrode structure further includes a plurality of core TX electrodes 516 (e.g., TX electrodes 205, FIG. 2B) disposed between the first and second ends of the TX electrode structure 504. A shape of each of the plurality of core TX sensor electrodes 516 differs from a shape of sensor electrodes included in the first and second electrode pairs 512 and 514. In some implementations, the first and second TX electrode pairs have an overall shape that differs from an overall shape of the plurality of core TX sensor electrodes 516 (e.g., rectangle). It should be noted that, in some implementations, an overall shape of a TX electrode pair is rectangular and an overall shape of a single core TX sensor electrode 516 is also rectangular. However, the overall shape of the TX electrode pair is approximately double the surface area of the overall shape of the single core TX sensor electrode 516.

Figure 8B:
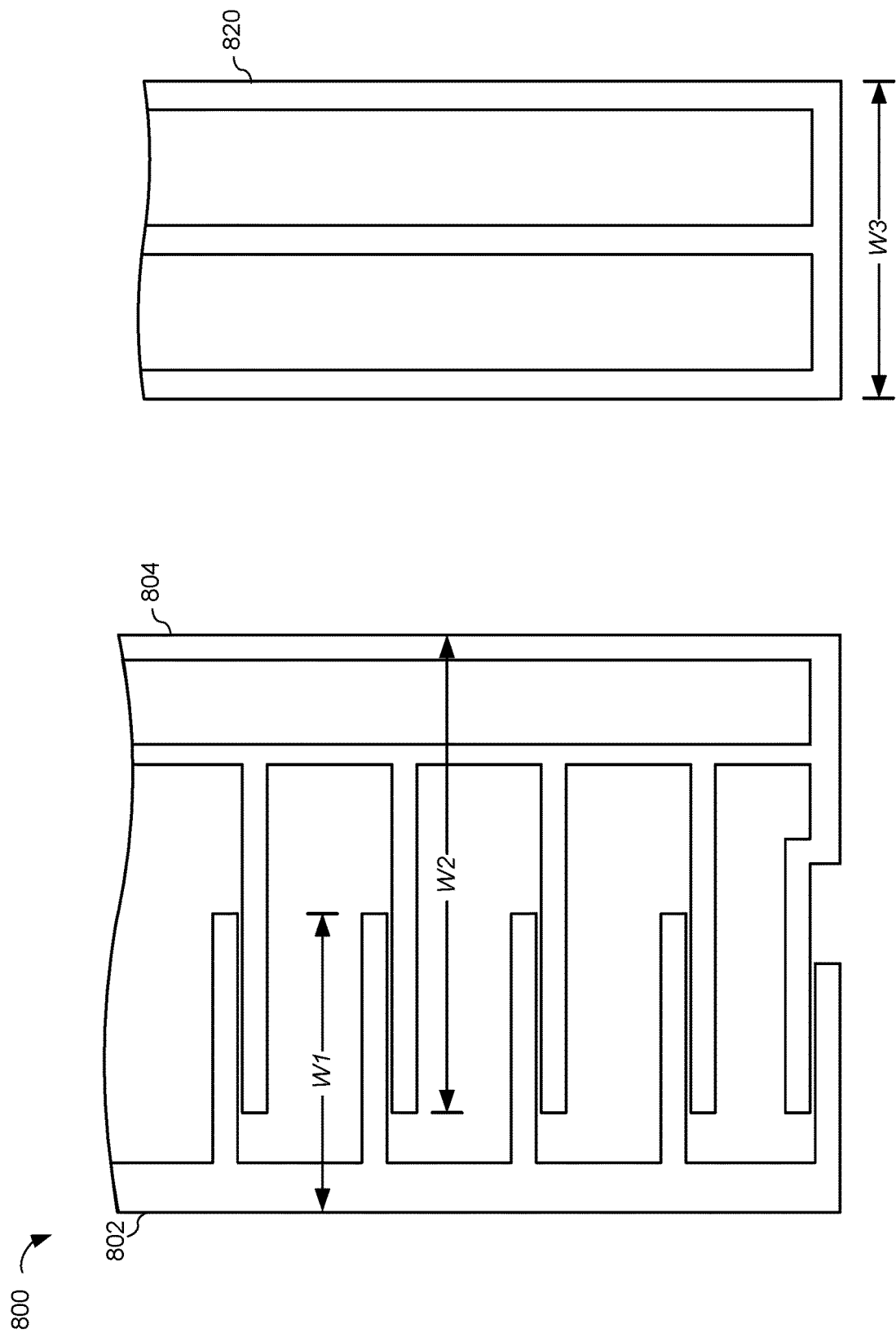
FIG. 8B illustrates an exemplary RX sensor electrode pair and a core RX sensor electrode, in accordance with various implementations.

The plurality of core TX electrodes 516 differs from the plurality of core RX electrodes 510. For example, each of the plurality of core TX electrodes 516 is rectangular in shape whereas each of the plurality of core RX electrodes 510 includes a three prong design, as shown in FIG. 8B.

In some implementations, the modified electrode structure removes eight core sensor electrodes in total from the bars and strips electrode structure illustrated in FIGS. 2A-2B. In particular, two core RX sensor electrodes 203 are removed from a first end of the RX electrode structure 202 and replaced with the first RX electrode pair, two other core RX sensor electrodes 203 are removed from a second end of the RX electrode structure 202 and replaced with the second RX electrode pair, two core TX sensor electrodes 205 are removed from a first end of the TX electrode structure 204 and replaced with the first TX electrode pair, and two other core TX sensor electrodes 205 are removed from a second end of the TX electrode structure 204 and replaced with the second TX electrode pair.

As discussed above, the bars and strips electrode structure (FIGS. 2A-2B) achieves both signal balance and touch difference-count balance. In order to maintain signal balance and touch difference-count balance in the modified electrode structure (FIGS. 5A-5B), a surface area of each electrode pair substantially matches a surface area of the two core sensor electrodes that it replaced. For example, the first RX electrode pair 506 (and the second RX electrode 508) has a surface area that substantially matches a surface area of the two core RX sensor electrodes removed from the first end of the RX electrode structure 202 and the first TX electrode pair 512 (and the second TX electrode 514) has a surface area that substantially matches a surface area of the two core TX sensor electrodes removed from the first end of the TX electrode structure 204 (and so on). In this way, signal responses for a touch along an edge of the touch-sensitive array resemble a touch in a central region of the touch-sensitive array.

Moreover, the modified electrode structure achieves the results shown in FIGS. 4A-4B. For example, due to the interlocking (e.g., mating) design of respective electrodes in an RX or TX electrode pair, a touch object centered above the interlocking features creates a first set of response signals (e.g., at position A in FIG. 4A). However, as the touch object translates away from the interlocking features (e.g., translates to position B in FIG. 4B), a signal response for one of the sensor electrode in the pair increases while a signal response for the other sensor electrode in the pair decreases (i.e., a second set of response signals is created). In some implementations, the increase and decrease is a linear increase and decrease, which is proportional to a distance from a center of the electrode pair.

Figure 6A:
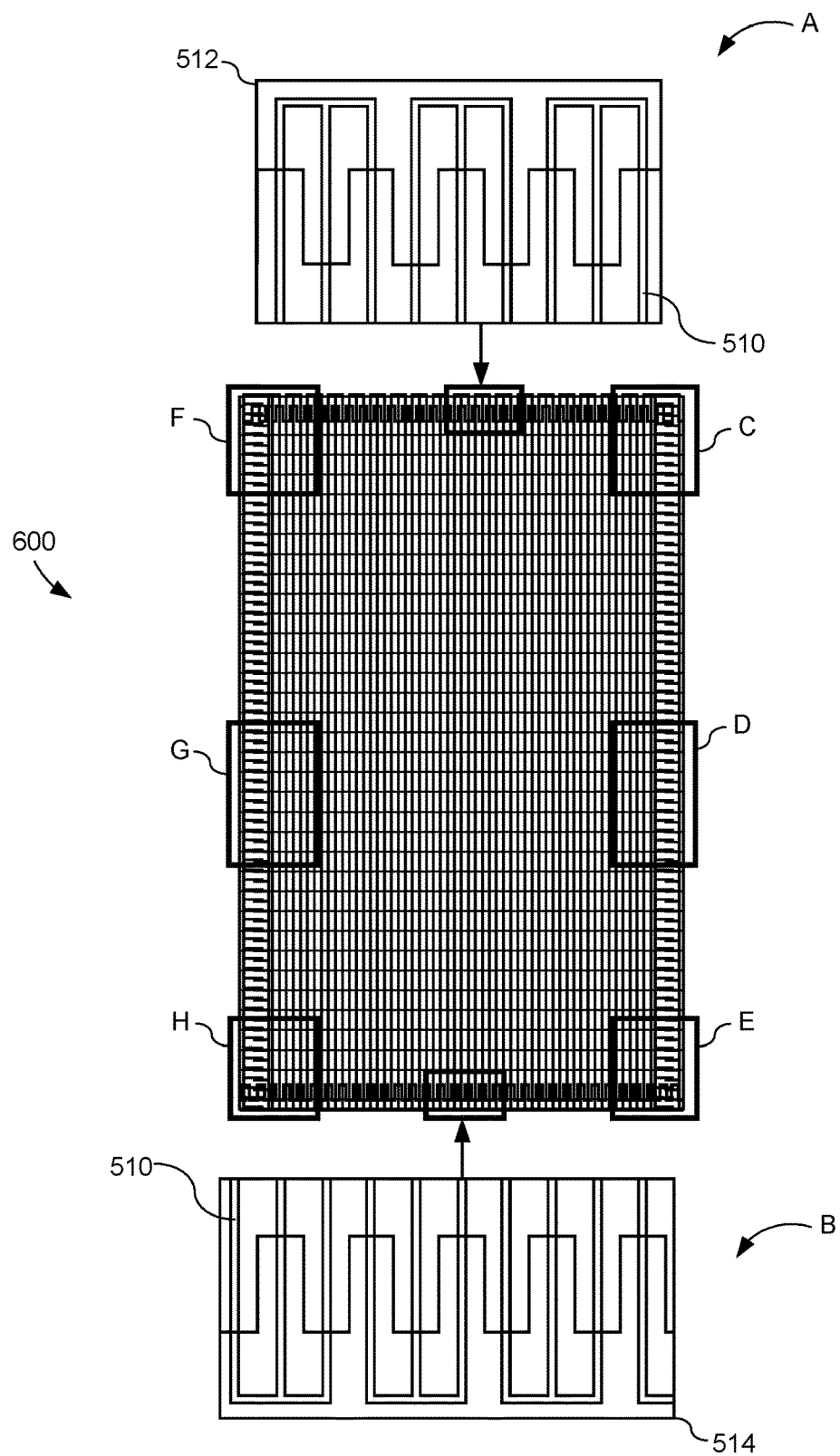
FIGS. 6A-6C illustrate a modified bars and strips electrode structure, with corresponding close-up views of the modified bars and strips electrode structure, in accordance with various implementations.
Figure 6B:
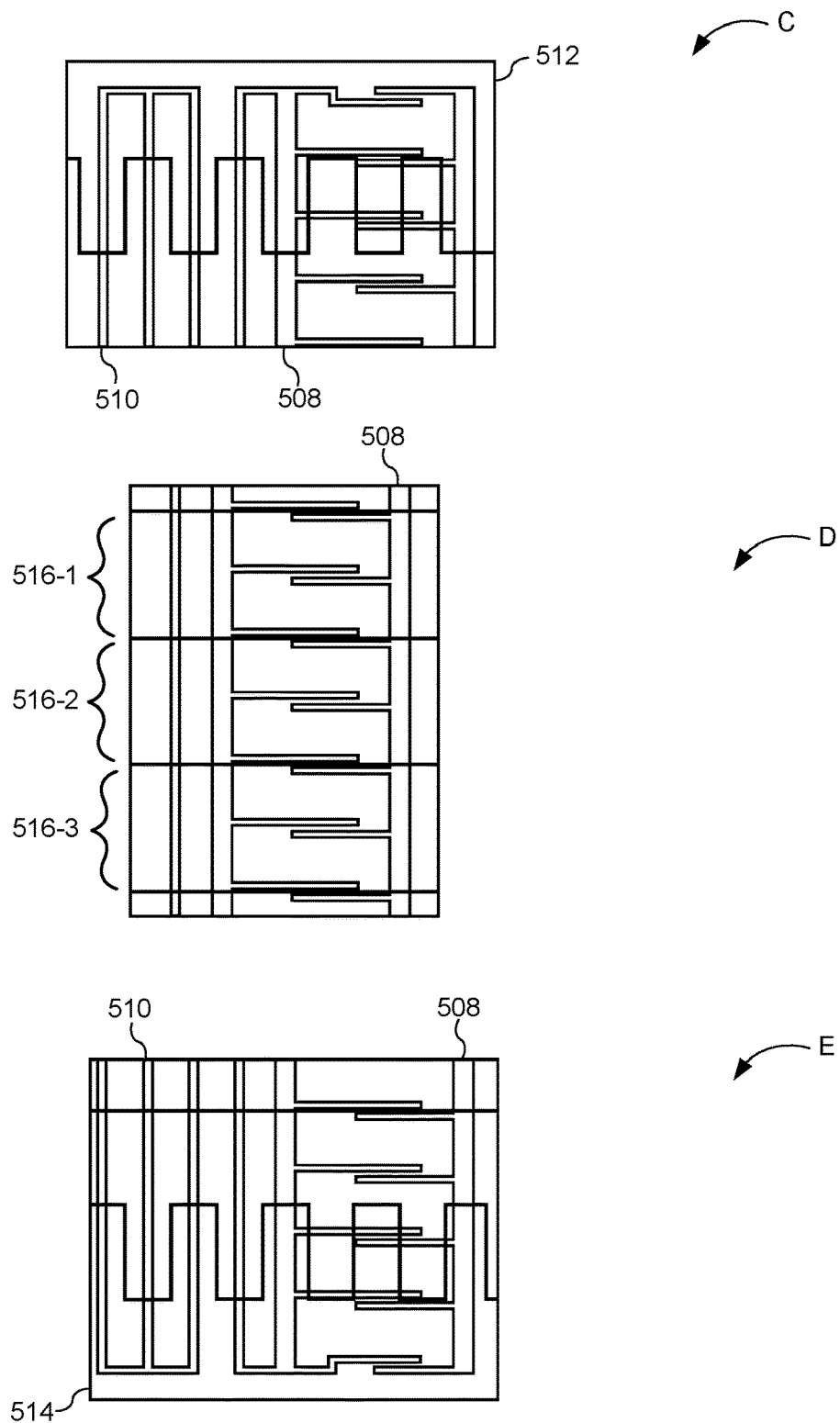
Figure 6C:
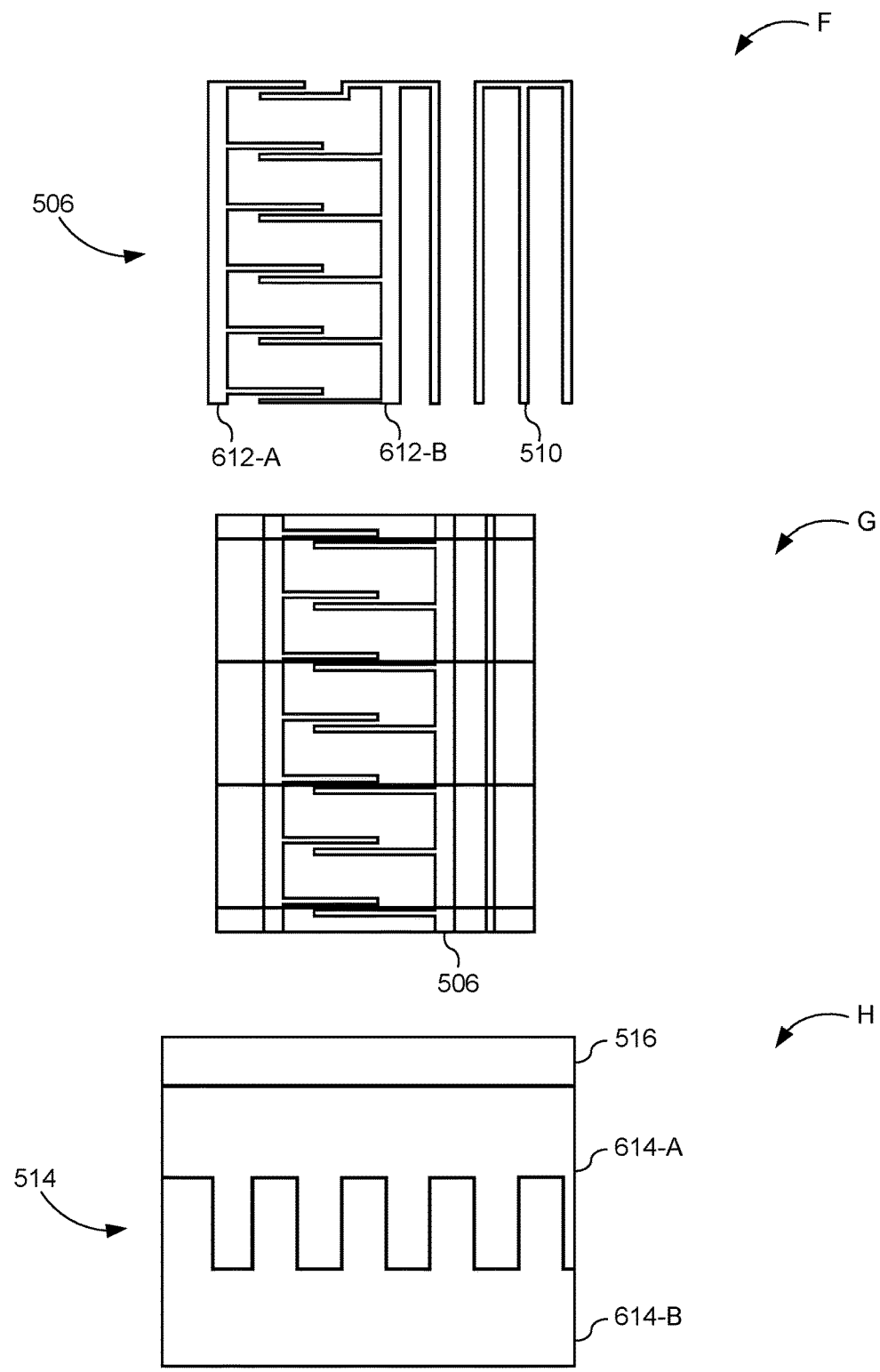

FIGS. 6A-6C illustrate a modified bars and strips electrode structure, with corresponding close-up views of the modified bars and strips electrode structure, in accordance with various implementations. One or more features in FIGS. 6A-6C (e.g., RX sensor electrodes) are shown as being transparent for ease of discussion and illustration.

FIG. 6A shows the RX electrode structure 502 disposed on top of the TX electrode structure 504 to form the modified bars and strips electrode structure. The modified electrode structure is part of a touch-sensitive array 600 (e.g., touch-sensitive array 132, FIG. 1). As shown, top and bottom ends (e.g., the first and second ends of the TX electrode structure 504, FIG. 5B) of the touch-sensitive array 600 include the first and second TX electrode pairs 512 and 514, respectively. Moreover, left and right ends (e.g., first and second ends of the RX electrode structure 502, FIG. 5A) of the touch-sensitive array 600 include the first and second RX electrode pairs 506 and 508, respectively. Accordingly, each end of the touch-sensitive array 600 is modified to resolve the edge detection issues discussed above with reference to FIGS. 3A-3B and FIGS. 4A-4B.

FIG. 6A also includes close-up views of portions of the touch-sensitive array 600. A first end view (A), taken along an end of the touch-sensitive array 600, includes the first TX electrode pair 512 (e.g., electrode pair 704, FIG. 7B) overlapping with a plurality of core RX sensor electrodes 510 of the RX electrode structure 502. The plurality of core RX sensor electrodes 510 is disposed perpendicular to the first TX electrode pair 512. In some implementations, each of the plurality of core RX sensor electrodes 510 is aligned with a corresponding portion of the first TX electrode pair 512. For example, the prongs of the plurality of core RX sensor electrodes 510 are aligned with horizontal portions of the first TX electrode pair 512. In another example (not shown), the prongs of the plurality of core RX sensor electrodes 510 are aligned with vertical portions of the first TX electrode pair 512.

A second end view (B), taken along an opposing end of the touch-sensitive array 600, includes the second TX electrode pair 514 (e.g., electrode pair 704, FIG. 7B) overlapping with the plurality of core RX sensor electrodes 510 of the RX electrode structure 502. Again, the plurality of core RX sensor electrodes 510 is disposed perpendicular to the second TX electrode pair 514, and each of the plurality of core RX sensor electrodes 510 is aligned with a corresponding portion of the second TX electrode pair 606 (e.g., horizontal portions of the first TX electrode pair 512 are centered about the prongs of the plurality of core RX sensor electrodes 510).

FIG. 6B illustrates additional close-up views of the touch-sensitive array 600. In particular, FIG. 6B includes a first corner view (C) of the touch-sensitive array 600. In the first corner view (C), a second RX electrode pair 508 (e.g., RX electrode pair 800, FIG. 8A) overlaps with the first TX electrode pair 512 at the first corner. FIG. 6B also includes a third end view (D) of the touch-sensitive array 600. Along an end of the touch-sensitive array 600, the second RX electrode pair 508 overlaps with a plurality of core TX sensor electrodes 516 of the TX electrode structure 504. FIG. 6B includes a second corner view (E) of the touch-sensitive array 600. As shown in the second corner view (E), the second RX electrode pair 508 overlaps with the second TX electrode pair 514 at the second corner.

As discussed above, each RX electrode pair includes connection members 806 and 808 (FIG. 8A). Additionally, now referring to FIG. 8A, a first connection member 806-1 is adjacent to and parallel with a second connection member 808-1. However, to maintain galvanic isolation, the first connection member 806-1 does not directly contact the second connection member 808-1 (i.e., there is a gap between the first and second connection members). Now referring to the third end view (D) of FIG. 6B, in some implementations, the plurality of core TX sensor electrodes 607-1-607-3 is aligned with the plurality of connection members 806 and 808. For example, borders for the plurality of core TX sensor electrodes 607-1-607-3 are aligned with the gaps between respective pairs of connection members). In another example (not shown), borders for the plurality of core TX sensor electrodes 607-1-607-3 are not aligned with the gaps between respective pairs of connection members.

FIG. 6C illustrates additional close-up views of the touch-sensitive array 600. In particular, FIG. 6C includes a third corner view (F) of the touch-sensitive array 600. For ease of illustration, the TX sensor electrodes have been removed from the third corner view (F). As shown, the first RX electrode pair 506 (e.g., RX electrode pair 800, FIG. 8A) includes a first RX sensor electrode 612-A and a second RX sensor electrode 612-B. In addition, the third corner view (F) includes one of the plurality of core RX sensor electrodes 510. FIG. 6C also includes a fourth end view (G) of the touch-sensitive array 600. Along an end of the touch-sensitive array 600, the first RX electrode pair 506 overlaps with the plurality of core TX sensor electrodes 516 of the TX electrode structure 504. FIG. 6C includes a fourth corner view (H) of the touch-sensitive array 600. For ease of illustration, the RX sensor electrodes have been removed. As shown, the second TX electrode pair 514 includes a first TX sensor electrode 614-A and a second TX sensor electrode 614-B. In addition, the fourth corner view (H) includes one of the plurality of core TX sensor electrodes 516. Although not shown, the first TX sensor electrode 614-A, the second TX sensor electrode 614-B, and the core TX sensor electrode 516 are separated by a gap in order to maintain galvanic isolation. In some implementations, the gap includes no dielectric material while in some implementations the gap includes a dielectric material (e.g., plastic), such as a dummy electrode.

Aside from the ends of the touch-sensitive array 600, the remainder of the touch-sensitive array 600 resembles the bars and strips sensor electrode structure shown in FIGS. 2A-2B (i.e., a "core" area of the touch-sensitive array remains substantially unchanged). In this way, fabrication of the modified electrode structure does not require complete retooling and/or reprogramming of an existing manufacturing process. In addition, the "core" area of the touch-sensitive array is maintains signal balance and touch difference-count balance.

FIGS. 7A-7B illustrate exemplary TX sensor electrode pairs, in accordance with various implementations.

FIG. 7A is an exemplary TX electrode pair 702. The TX electrode pair 702 includes a first TX sensor electrode 706 mated with a second TX sensor electrode 708. The first TX sensor electrode 706 includes a first edge pattern and the second TX sensor electrode 708 includes a complementary edge pattern, thereby allowing the first TX sensor electrode 706 to mate with the second TX sensor electrode 708. As shown, the first TX sensor electrode 706 and the second TX sensor electrode 708, although mated, a separated by a gap. In some implementations, the gap includes no dielectric material while in some implementations the gap includes a dielectric material, such as a dummy electrode.

FIG. 7B is a different exemplary TX electrode pair 704. In this example, the TX electrode pair 704 includes a first TX sensor electrode 710 mated with a second TX sensor electrode 712. The first TX sensor electrode 710 includes a second edge pattern and the second TX sensor electrode 712 includes a complementary edge pattern, thereby allowing the first TX sensor electrode 710 to mate with the second TX sensor electrode 712. As shown, the first TX sensor electrode 710 and the second TX sensor electrode 712, although mated, a separated by a gap. In some implementations, the gap includes no dielectric material while in some implementations the gap includes a dielectric material, such as a dummy electrode.

It should be noted that other edge patterns can be used, and the two patterns shown in FIGS. 7A and 7B are merely examples. One having ordinary skill in the art will appreciate that other complementary edge patterns can be used, and these other complementary edge patterns have been omitted for the sake of brevity. In addition, the TX electrode pairs 702 and 704 are examples of the TX electrodes pairs 512 and 514 discussed above (i.e., the TX electrode pairs 702 and 704 extend along opposing ends of the touch-sensitive array 600).

For ease of discussion, the description below will refer to the first TX sensor electrode 710 and the second TX sensor electrode 712 of FIG. 7B. However, the description below applies equally to the first TX sensor electrode 706 and the second TX sensor electrode 708 of FIG. 7A (and other TX electrode pair designs).

In some implementations, a surface area of the first TX sensor electrode 710 matches a surface area of the second TX sensor electrode 712. Alternatively, in some implementations, a surface area of the first TX sensor electrode 710 differs from a surface area of the second TX sensor electrode 712. In such implementations, the surface area of the first TX sensor electrode 710 may decrease by a first amount and the surface area of the second TX sensor electrode 712 may decrease by a second amount, or vice versa. In some implementations, the first amount is equal (or substantially equal) to the second amount. In some implementations, the first amount differs from the second amount.

Each core TX electrode of the plurality of core TX electrodes has a surface area (e.g., core TX electrodes 516 have the same surface area, FIG. 5B). In addition, in some implementations, a surface area of at least one TX sensor electrode in a TX electrode pair 704 substantially matches the surface area of each core TX electrode. Alternatively, in some implementations, a surface area of each TX sensor electrode in a TX electrode pair 704 substantially matches the surface area of each core TX electrode. In some implementations, a surface area of the TX electrode pair 704 is approximately double a surface area of a single core TX sensor electrode.

In some implementations, a width of each TX sensor electrode in a TX electrode pair 704 substantially matches a width of each TX electrode of the plurality of core TX electrodes. In some implementations, a width of the first TX electrode 710 is less than a width of the second TX electrode 712, or vice versa. In addition, in some implementations, the width of the first TX electrode 710 is substantially the same as a width of each of the plurality of core TX electrodes.

The TX electrode pairs described above maintain signal balance and touch difference-count balance across the touch-sensitive array (at least for the TX electrode structure). In such configurations, assuming equal touch objects, a touch in an edge region of the touch-sensitive array (e.g., a touch on the TX electrode pair 704) will at least resemble a touch in a core region of the touch-sensitive array (e.g., signal responses for the touch in the edge region are within an acceptable range of signal responses for the touch in the core region).

FIG. 8A is an exemplary RX electrode pair 800. In contrast to TX electrode pairs shown in FIGS. 7A-7B, the RX electrode pair 800 includes open space (i.e., empty areas between and within RX sensor electrodes 801-A and 801-B). Without the open space, a touch object could not interact with the TX electrode pair disposed below the RX electrode pair 800. Put another way, the open space allows the touch object to disrupt an electromagnetic field formed between the RX and TX electrode pairs, thereby causing a change in measured capacitance.

The RX electrode pair 800 includes a first RX sensor electrode 802 mated with a second RX sensor electrode 804. The first RX sensor electrode 802 includes a first plurality of connection members 806 and the second RX sensor electrode 804 includes a second plurality of connection members 808. Each respective connection member of the first plurality of connection members 806 is adjacent and parallel to a respective connection member of the second plurality of connection members 808. In addition, to maintain galvanic isolation, the first plurality of connection members 806 does not directly contact the second plurality of connection members 808 (i.e., there is a gap between adjacent connection members).

In some implementations, respective end connection members of the second plurality of connection members 808 have a first shape and respective middle connection members of the second plurality of connection members 808 and the first plurality of connection members have a second shape different from the first shape. For example, end connection member 808-5 has the first shape and the other connection members 808-1-808-4 have the second shape (e.g., a rectangle). The respective end connection members have the first shape because a housing (not shown) of the device borders the respective end connection members.

In some implementations, the first shape includes a first portion 810-1 disposed in a first direction (e.g., horizontal), a second portion 810-2 disposed in a second direction perpendicular to the first direction (e.g., vertical), and a third portion (810-3) offset from the first portion and disposed in the first direction (dotted lines defining border of each portion). In some implementations, the first portion 810-1 is longer than the second portion 810-2 and shorter than the third portion 810-3. Alternatively, in some implementations, the first portion 810-1 is longer (or the same) than the third portion 810-3.

In some implementations, end connection members of the first plurality of connection members 806 are shorter than middle connection members of the first plurality of connection members 806. For example, end connection member 806-5 has a length (D3), which is substantially less than a length (D2) of middle connection member 806-3. In some implementations, the end connection member 806-5 has a reduced length to compensate for an increase in surface area of the respective end connection member 808-5 (e.g., to compensate for surface area of the second portion 810-2). In doing so, signal balance and touch difference-count balance are maintained (surface areas are discussed in further detail below).

Alternatively, in some implementations, end connection members of the first plurality of connection members 806 are the same length as middle connection members of the first plurality of connection members 806 (e.g., D3 is substantially equal to D2).

In some implementations, lengths of middle connection members of the first plurality of connection members (e.g., connection members 806-1-806-4) are shorter than lengths of middle connection members of the second plurality of connection members (e.g., connection members 808-1-808-4). For example, middle connection member 806-3 has a length (D2) than is less than a length (D1) of middle connection member 808-3.

In some implementations, a surface area of the first RX sensor electrode 802 matches a surface area of the second RX sensor electrode 804. Alternatively, in some implementations, a surface area of the first RX sensor electrode 802 differs from a surface area of the second RX sensor electrode 804. In such implementations, the surface area of the first RX sensor electrode 802 may decrease by a first amount and the surface area of the second RX sensor electrode 804 may decrease by a second amount, or vice versa. In some implementations, the first amount is equal to the second amount. In some implementations, the first amount differs from the second amount.

Now referring to FIG. 8B, each core RX electrode of the plurality of core RX electrode has a surface area. In addition, in some implementations, a surface area of at least one RX sensor electrode in a RX electrode pair substantially matches the surface area of each core RX electrode. For example, core RX sensor electrode 820 has a first surface area and the second RX sensor electrode 804 has a second surface area that is substantially the same as the first surface area. In some implementations, a surface area of each RX sensor electrode in a RX electrode pair substantially matches the surface area of each core RX electrode. Alternatively, in some implementations, a surface area for the RX electrode pair 800 is approximately double a surface area of the core RX sensor electrode 820.

In some implementations, a width (W1) of the first RX electrode 802 is less than a width (W2) of the second RX electrode (W2). In addition, in some implementations, the width (W1) of the first RX electrode 802 is substantially the same as a width of each of the plurality of core RX electrodes (e.g., width (W3) of the core RX electrode 820).

In some implementations, open space (e.g., open space 801-A and 801-B, FIG. 8A) of the RX electrode pair 800 substantially matches open space of the core RX sensor electrode 820.

The RX electrode pair 800 is configured to maintain signal balance and touch difference-count balance across the touch-sensitive array (at least for the RX electrode structure). In such configurations, assuming equal touch objects, a touch in an edge region of the touch-sensitive array (e.g., a touch on the RX electrode pair 800) will at least resemble a touch in a core region of the touch-sensitive array (e.g., signal responses for the touch in the edge region are within an acceptable range of signal responses for the touch in the core region).

Additionally, because both the RX electrode pairs and the TX electrode pairs are configuration to maintain signal balance and touch difference-count balance, the modified electrode structure (e.g., touch-sensitive array 600), as a whole, maintains signal balance and touch difference-count balance.

FIG. 9 illustrates signal response graphs (i.e., touch difference-counts graphs) from a touch object centered above an RX sensor electrode. In the left most signal response graph, the RX1 sensor electrode is reported as having the largest touch difference count, and neighboring sensor electrodes RX0 and RX2 are reported as having lesser, yet equal, difference counts. The RX sensor electrodes RX0 and RX2 have equal difference counts because the touch object interacts equally with the RX sensor electrodes RX0 and RX2 (i.e., difference-count balance is achieved). This is a desired result when the touch object is centered above the RX1 sensor electrode. However, when RX sensor electrodes are out of balance (i.e., difference-count balance is not achieved), undesired results are reported, which are shown in the center and right most signal response graphs. To achieve touch difference-count balance, each RX sensor electrode should be substantially the same (e.g., a surface area of each RX sensor electrode should be substantially the same). The modified bar and strips electrode structure discussed above is configured to achieve difference-count, as discussed above.

It will be understood that, although the terms "first," "second," etc. may be used herein to describe various elements, these elements should not be limited by these terms. These terms are only used to distinguish one element from another. For example, a first sensor electrode could be termed a second sensor electrode, and, similarly, a second sensor electrode could be termed a first sensor electrode, which changing the meaning of the description, so long as all occurrences of the "first sensor electrode" are renamed consistently and all occurrences of the second sensor electrode are renamed consistently. The first sensor electrode and the second sensor electrode are both sensor electrodes, but they are not the same sensor electrode.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations.

However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A touch-sensitive array, comprising:
a first electrode structure, having opposing first and second ends, including:
a first transmit (TX) electrode pair at the first end of the first electrode structure;
a plurality of core TX electrodes disposed between the first and second ends of the first electrode structure; and
a second TX electrode pair at the second end of the first electrode structure; and
a second electrode structure disposed on top of or below the first electrode structure, having opposing first and second ends, including:
a first receive (RX) electrode pair at the first end of the second electrode structure;
a plurality of core RX electrodes disposed between the first and second ends of the second electrode structure;
a second RX electrode pair at the second end of the second electrode structure, and
wherein:
the first and second RX electrode pairs each include a first and second plurality of connection members,
each respective connection member of the first plurality of connection members is immediately adjacent and parallel to a respective connection member of the second plurality of connection members, and
each adjacent connection member of the first plurality of connection members extends a first length along a first direction and each adjacent connection member of the second plurality of connection members extends a second length along a second direction opposite the first direction, wherein the first length distinct from the second length.

2. The touch-sensitive array of claim 1, wherein:
the first and second TX electrode pairs each has an overall shape; and
each of the plurality of core TX electrodes also has the overall shape.

3. The touch-sensitive array of claim 1, wherein:
the first and second TX electrode pairs each has a first overall shape; and
each of the plurality of core TX electrodes has a second overall shape that differs from the first overall shape.

4. The touch-sensitive array of claim 3, wherein:
the first and second TX electrode pairs each comprise a first TX electrode and a second TX electrode; and
the first TX electrode has a first shape and the second TX electrode has a complementary second shape, both of which compose the first overall shape.

5. The touch-sensitive array of claim 3, wherein:
the first and second RX electrode pairs each has a third overall shape; and
each of the plurality of core RX electrodes has the second overall shape, the third overall shape being different from the first and second overall shapes.

6. The touch-sensitive array of claim 5, wherein:
the first and second RX electrode pairs each comprise a first RX electrode and a second RX electrode; and
the first RX electrode has a third shape and the second RX electrode has a fourth shape, both of which compose the third overall shape.

7. The touch-sensitive array of claim 1, wherein:
the first electrode structure is disposed in a first direction; and
the second electrode structure is disposed in a second direction perpendicular to the first direction.

8. The touch-sensitive array of claim 7, wherein each edge of the first electrode structure is aligned with one edge of the second electrode structure.

9. The touch-sensitive array of claim 1, wherein:
the touch-sensitive array comprises first, second, third, and fourth perpendicular edges;
the first end of the first electrode structure corresponds to the first edge;
the second end of the first electrode structure corresponds to the second edge;
the first end of the second electrode structure corresponds to the third edge; and
the second end of the second electrode structure corresponds to the fourth edge.

10. The touch-sensitive array of claim 1, wherein:
the first and second RX electrode pairs each comprise a first RX electrode and a second RX electrode;
each core RX electrode of the plurality of core RX electrodes has a predefined surface area; and
a surface area of the second RX electrode is substantially the same as the predefined surface area.

11. The touch-sensitive array of claim 10, wherein a width of the first RX electrode is less than a width of the second RX electrode.

12. The touch-sensitive array of claim 10, wherein a width of the first RX electrode is substantially the same as a width of each of the plurality of core RX electrodes.

13. The touch-sensitive array of claim 1, wherein end connection members of the first plurality of connection members are a third length shorter than the first length and at least a portion of end connection members of the second plurality of connection members are a fourth length shorter than the second length.

14. The touch-sensitive array of claim 1, wherein:
respective end connection members of the second plurality of connection members and the first plurality of connection members have a first shape; and
respective middle connection members of the second plurality of connection members and the first plurality of connection members have a second shape different from the first shape and based on the first length of the first plurality of connection members and the second length of the of the second plurality of connection members.

15. The touch-sensitive array of claim 14, wherein the first shape comprises:
a first end connection member of the first plurality of connection members disposed in the first direction;
a connecting portion of the second plurality of connection members disposed in a third direction perpendicular to the first direction; and
a second end connection member of the second plurality of connection members offset from the first end connection member of the first plurality of connection members and disposed in the second direction opposite the first direction.

16. The touch-sensitive array of claim 15, wherein:
the first end connection member of the first plurality of connection members is longer than the connecting portion of the second plurality of connection members and shorter than the second end connection member of the second plurality of connection members; and
a length of the connecting portion of the second plurality of connection members is substantially equal to a height of the first and second plurality of connection members.

17. The touch-sensitive array of claim 1, wherein the first and second electrode structures are to reduce errors in reported locations of touches at or adjacent to edges of the touch-sensitive array.

18. The touch-sensitive array of claim 1, wherein:
the first TX electrode pair, the plurality of core TX electrodes, and the second TX electrode pair share a first common plane; and
the first RX electrode pair, the plurality of core RX electrodes, and the second RX electrode pair share a second common plane.

19. The touch-sensitive array of claim 1, wherein:
the first plurality of connection members are adjacent to a respective edge, and
the second plurality of connection members are disposed between the first plurality of connection members and the plurality of core RX electrodes.

20. A touch-sensitive device, comprising:
one or more processors;
memory; and
a touch-sensitive array for reducing errors in reported locations of touches at or adjacent to edges of the touch-sensitive array, the touch-sensitive array comprising:
a first electrode structure, having opposing first and second ends, including:
a first transmit (TX) electrode pair at the first end of the first electrode structure;
a plurality of core TX electrodes disposed between the first and second ends of the first electrode structure; and
a second TX electrode pair at the second end of the first electrode structure; and
a second electrode structure disposed on top of or below the first electrode structure, having opposing first and second ends, including:
a first receive (RX) electrode pair at the first end of the second electrode structure;
a plurality of core RX electrodes disposed between the first and second ends of the second electrode structure;
a second RX electrode pair at the second end of the second electrode structure, and
wherein:
the first and second RX electrode pairs each include a first and second plurality of connection members,
each respective connection member of the first plurality of connection members is immediately adjacent and parallel to a respective connection member of the second plurality of connection members, and
each adjacent connection member of the first plurality of connection members extends a first length along a first direction and each adjacent connection member of the second plurality of connection members extends a second length along a second direction opposite the first direction, wherein the first length distinct from the second length.

21. A touch-sensitive array, comprising:
a first electrode structure, having opposing first and second ends, including:
a first transmit (TX) electrode pair at the first end of the first electrode structure;
a plurality of core TX electrodes disposed between the first and second ends of the first electrode structure;
the second TX electrode pair at the second end of the first electrode structure, and
wherein the first TX electrode pair, the second TX electrode pair, and each core TX electrode of the plurality of core TX electrodes are separated by a gap; and
a second electrode structure disposed on top of or below the first electrode structure, having opposing first and second ends, including:
a first receive (RX) electrode pair at the first end of the second electrode structure;
a plurality of core RX electrodes disposed between the first and second ends of the second electrode structure;
the second RX electrode pair at the second end of the second electrode structure, and
wherein:
the first RX electrode pair, the second RX electrode pair, and each core RX electrode of the plurality of core TX electrodes are separated by a gap;
the first and second RX electrode pairs each include a first and second plurality of connection members,
each respective connection member of the first plurality of connection members is immediately adjacent and parallel to a respective connection member of the second plurality of connection members, and
each adjacent connection member of the first plurality of connection members extends a first length along a first direction and each adjacent connection member of the second plurality of connection members extends a second length along a second direction opposite the first direction, wherein the first length distinct from the second length.

* * * * *